Nov. 19, 1929.    E. J. SCHUDA    1,736,468

WRINGER

Filed Dec. 20, 1927

Ernest J. Schuda
INVENTOR.

BY
ATTORNEYS.

Patented Nov. 19, 1929

1,736,468

UNITED STATES PATENT OFFICE

ERNEST J. SCHUDA, OF ERIE, PENNSYLVANIA, ASSIGNOR TO LOVELL MANUFACTURING COMPANY, OF ERIE, PENNSYLVANIA, A CORPORATION OF PENNSYLVANIA

WRINGER

Application filed December 20, 1927. Serial No. 241,301.

This invention is designed to improve the detail mechanism involved in a release device for a clothes wringer. Features and details of the invention will appear more particularly from the specification and claims.

A preferred embodiment of the invention is illustrated in the accompanying drawings as follows:—

Figure 1:
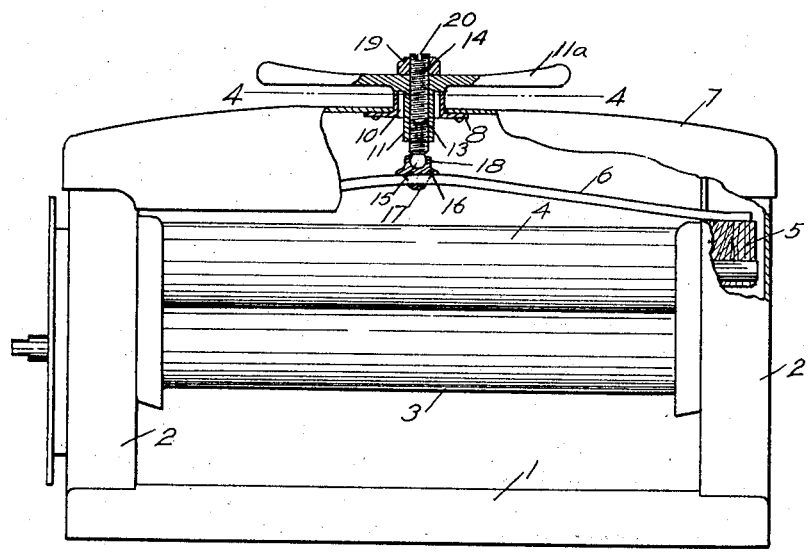

Fig. 1 shows a front elevation of a wringer, partly in section.

Figure 2:
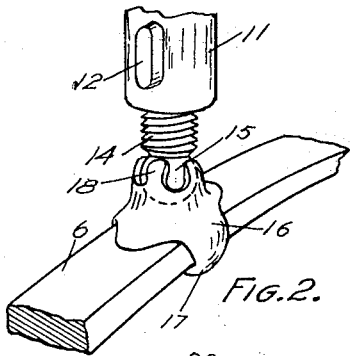

Fig. 2 an enlarged perspective view of the connection between the tension screw and the spring.

Figure 3:
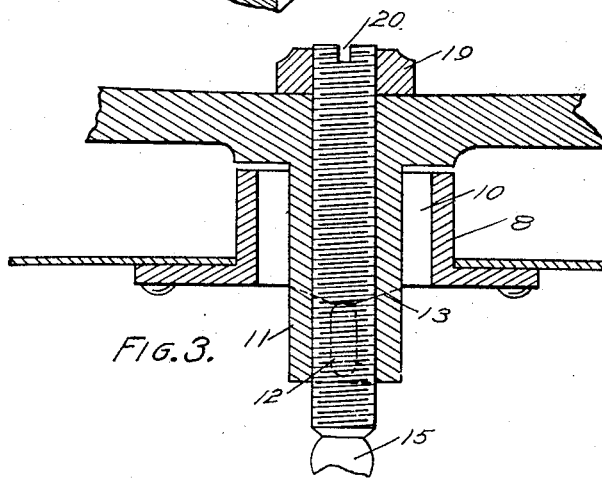

Fig. 3 an enlarged sectional view of the release device.

Figure 4:
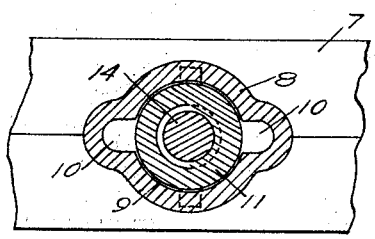

Fig. 4 a section on the line 4—4 of Fig. 1.

The frame of the wringer is made up of the bottom piece 1 and stiles 2. Wringer rolls 3 and 4 are mounted in the stiles with bearings 5 in the usual manner and a pressure spring 6 operates on the upper bearings to exert pressure on the rolls. A top rail 7 is secured to the stiles.

A fitting 8 is secured to the top rail. This has a vertical opening 9, the opening having the key-hole shaped extensions 10.

A release sleeve 11 extends through the opening. It is provided with shoulders 12, the shoulders 12 being adapted to enter the extensions 10 when brought into register therewith and the shoulder being adapted to engage the under-side of the fitting which is preferably provided with a cam 13. The sleeve has handles 11ª by means of which the sleeve may be turned to, or from the released position.

A screw 14 screw-threaded entirely to the top thereof extends through the sleeve and is adapted to be assembled by screwing it through the bottom of the sleeve. This screw is provided with a ball 15 at its lower end and this ball extends into a fitting 16. The fitting 16 is secured by ears 17. The fitting being formed of malleable iron, the ears can be readily bent around the spring so as to assure its engagement therewith. The upper surface of the fitting is provided with a socket receiving the ball and this socket comprises fingers 18 which are bent from the ball sufficiently to secure the ball in the socket. A jam nut 19 is screwed on to the upper end of the screw and thus locks the screw with the sleeve.

The screw is provided with a cross slot 20 at its upper end by means of which the tension on the spring may be adjusted.

One of the advantages of this construction is the compactness of the release device as it extends a very little distance overall of the sleeve. The socket joint completely assembles the screw with the spring and permits the entire freedom of the spring under the varying movements to which it is subjected. By making the screw thread throughout the ball may be assembled in the socket and the screw assembled in the sleeve by screwing it in from the bottom.

What I claim as new is:—

1. In a wringer, the combination of a frame; rolls in the frame; a spring exerting pressure on the rolls; a top rail; a fitting on the top rail having an opening therethrough; a sleeve rotatably mounted in the opening, said sleeve being internally screw-threaded, said sleeve and fitting comprising means having a rotatable part releasable upon the rotation of the sleeve; a screw in the sleeve, said screw being threaded to the top of the screw and assembled in the sleeve from the bottom; and a connection between the screw and the spring.

2. In a wringer, the combination of a frame; rolls in the frame; a spring exerting pressure on the rolls; a top rail; a fitting on the top rail having an opening therethrough; a sleeve rotatably mounted in the opening, said sleeve being internally screw-threaded, said sleeve and fitting comprising means having a rotatable part releasable upon the rotation of the sleeve; a screw in the sleeve exerting tension on the spring, said screw being screw-threaded from the top and adapted to be assembled from the bottom and having a screw driving engaging surface at the top; and a rotatable connection between the bottom of the screw and the spring.

3. In a wringer, the combination of a frame; rolls in the frame; a spring exerting pressure on the rolls; a top rail; a fitting on the top rail having an opening therethrough;

a sleeve rotatably mounted in the opening, said sleeve being internally screw-threaded, said sleeve and fitting comprising means having a rotatable part releasable upon the rotation of the sleeve; a screw in the sleeve, said screw being threaded to the top of the screw and assembled in the sleeve from the bottom; a connection between the screw and the spring; and a jam nut on the upper end of the screw locking the screw with the sleeve.

In testimony whereof I have hereunto set my hand.

ERNEST J. SCHUDA.